(12) United States Patent
Bucks et al.

(10) Patent No.: US 6,972,525 B2
(45) Date of Patent: Dec. 6, 2005

(54) LED SWITCHING ARRANGEMENT

(76) Inventors: Marcel Johannes Maria Bucks, De Rijn 2, Best 5680 AK (NL); Engbert Bernard Gerard Nijhof, De Rijn 2, Best 5680 AK (NL)

( * ) Notice: Subject to any disclaimer, the term of this patent is extended or adjusted under 35 U.S.C. 154(b) by 12 days.

(21) Appl. No.: 10/483,862

(22) PCT Filed: Jul. 18, 2002

(86) PCT No.: PCT/IB02/03111

§ 371 (c)(1),
(2), (4) Date: Jan. 14, 2004

(87) PCT Pub. No.: WO03/009654

PCT Pub. Date: Jan. 30, 2003

(65) Prior Publication Data

US 2004/0170037 A1    Sep. 2, 2004

(30) Foreign Application Priority Data

Jul. 19, 2001 (EP) .................................. 01202773

(51) Int. Cl.[7] .......................... H05B 37/00; H03K 3/17
(52) U.S. Cl. .............. 315/165 R; 315/244; 315/200 R
(58) Field of Search ........................... 315/185 R, 244, 315/86, 291, 200 R, 209

(56) References Cited

U.S. PATENT DOCUMENTS

| 5,287,372 | A | * | 2/1994 | Ortiz | 372/38.07 |
| 5,459,478 | A | * | 10/1995 | Bolger et al. | 345/46 |
| 5,682,306 | A | | 10/1997 | Jansen | |
| 5,736,881 | A | * | 4/1998 | Ortiz | 327/175 |
| 6,359,392 | B1 | * | 3/2002 | He | 315/291 |
| 6,411,045 | B1 | * | 6/2002 | Nerone | 315/291 |
| 6,853,150 | B2 | * | 2/2005 | Clauberg et al. | 315/185 R |

* cited by examiner

*Primary Examiner*—Bao Q. Vu
(74) *Attorney, Agent, or Firm*—Larry LiBerchuk

(57) ABSTRACT

A switching arrangement includes first, second and third circuits. The first circuit is connected between a first input and a first output of the switching arrangement. The first circuit has a self-inductance, a capacitor and a diode. The second circuit is connected between the first input and a second input of the switching arrangement, and includes a switching element. The third circuit is connected between the first output and a second output of the switching arrangement, and has a diode and an inductive winding. The switching arrangement further includes a transformer having a primary winding, where the inductive winding forms a secondary winding of the transformer

10 Claims, 4 Drawing Sheets

LED SWITCHING ARRANGEMENT

Figure 1:
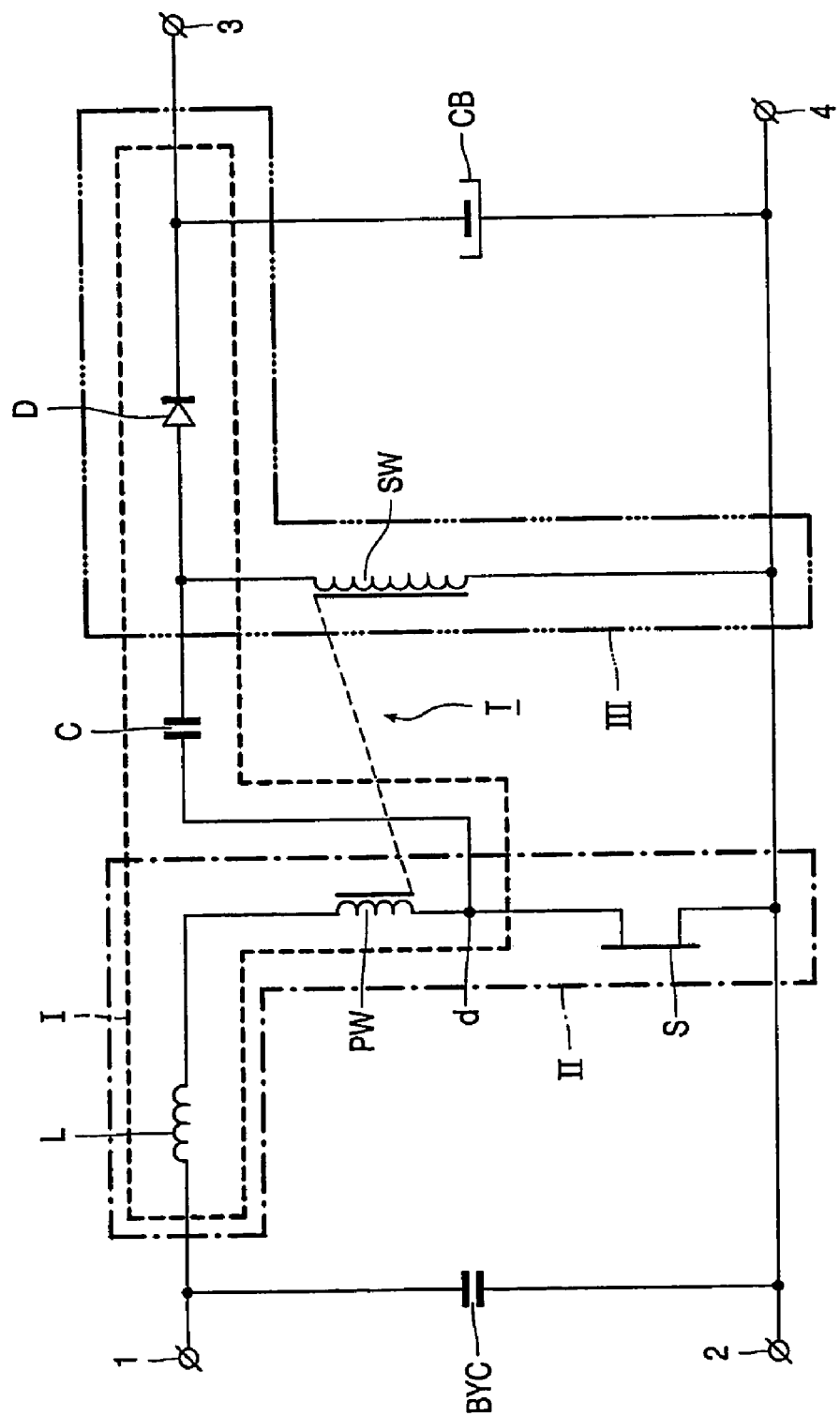

The invention relates to a switching arrangement for operating a load, which switching arrangement is provided with input terminals for connecting a supply source, output terminals for connecting the load to be operated, a first series circuit between one of the input terminals and one of the output terminals, including at least a self-inductance, a capacitor and a diode, a second series circuit between the input terminals, including at least said self-inductance and a switching element which is alternately switched to a conducting state and a non-conducting state at a high frequency, a third series circuit between the output terminals, including at least said diode and an inductive winding.

A switching arrangement of the kind referred to in the introduction is known from U.S. Pat. No. 5,682,306. In the known switching arrangement, which is also known by the name of SEPIC (Single Ended Primary Inductance Converter), the self-inductance forms a first energy storage element, and there will be a voltage across the capacitor substantially of the magnitude of an input voltage applied to the input terminals. This type of converter appears to be suitable for driving an LED array comprising at least one LED as the load. LED arrays are very suitable for use as a light source, for example in a traffic lights installation, inter alia on account of their low energy consumption in comparison with incandescent lamps which are suitable for use in such traffic lights installations, and on account of the fact that they have a much longer life than the incandescent lamps in question. In such an application, the switching arrangement and the LED array in question are generally supplied with power from a public mains as the power supply source.

One drawback of the known switching arrangement is the occurrence of a relatively high level of radio interference (EMI).

It is the object of the invention to provide a measure for reducing the EMI level.

In order to achieve that objective, a switching arrangement of the kind referred to in the introduction as the switching arrangement according to the invention is characterized in that the inductive winding forms a secondary winding of a transformer which has a primary winding which forms part of both the first and the second series circuit.

In this way it is achieved that a high-frequency voltage signal across the self-inductance caused by the high-frequency switching of the switching element is effectively compensated in large measure. As a result, the generation of EMI will be significantly reduced. Since full compensation by means of the primary winding does not occur in practice, a further reduction can be advantageously achieved by arranging a bypass capacitor between the input terminals, which capacitor functions as a bypass for the high-frequency ripple current signal generated in the self-inductance by the switching element.

An optimum result can be achieved if the arrangement is configured in accordance with the relation $$2\pi[(L1+Ls)C3]^{1/2} > \delta,$$

wherein:

L1 is the magnitude of the self-inductance in H,

Ls is the magnitude of the self-inductance of the secondary winding in H,

C3 is the capacitance of the capacitor in F, and $\delta$ is the fraction in s of each switching period of the switching element during which the switching element is switched in its non-conducting state.

In another embodiment of the switching arrangement according to the invention, the secondary winding is made up of a first winding and a second winding, which second winding is incorporated in the first series circuit and which also has a connection point with the first winding. Thus, an auto transformer function has been effected, as a consequence of which the periodic switching of the switching element to a non-conducting state takes place at a reduced current value. Another consequence is the fact that this leads to an increase of $\delta$. Both consequences have an advantageous influence as regards the reduction of the objectionable influence of EMI, on the one hand as a result of the reduction of the amount of EMI and on the other hand as a result of a shift to lower frequencies.

Figure 2:
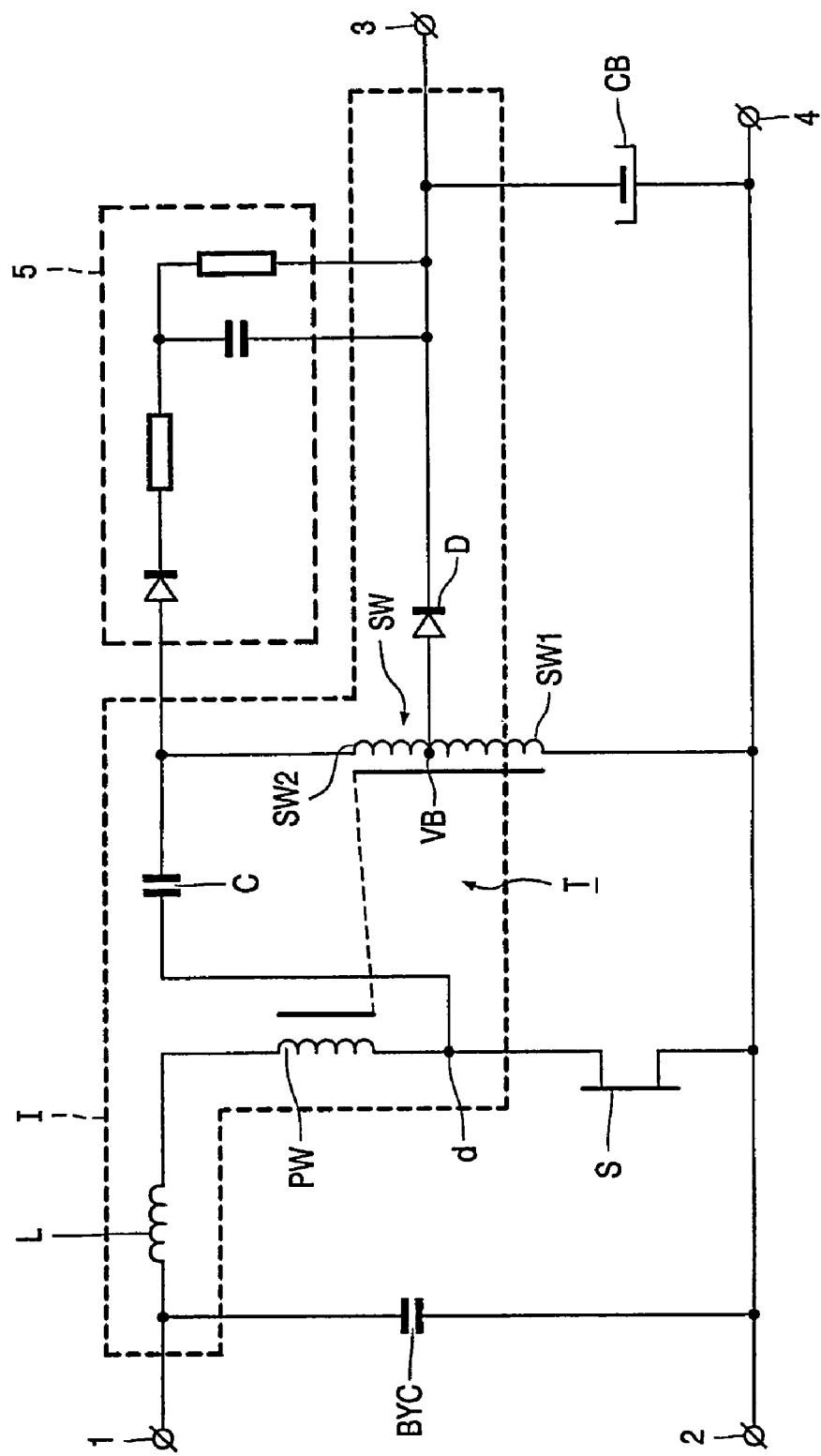
Figure 3A:
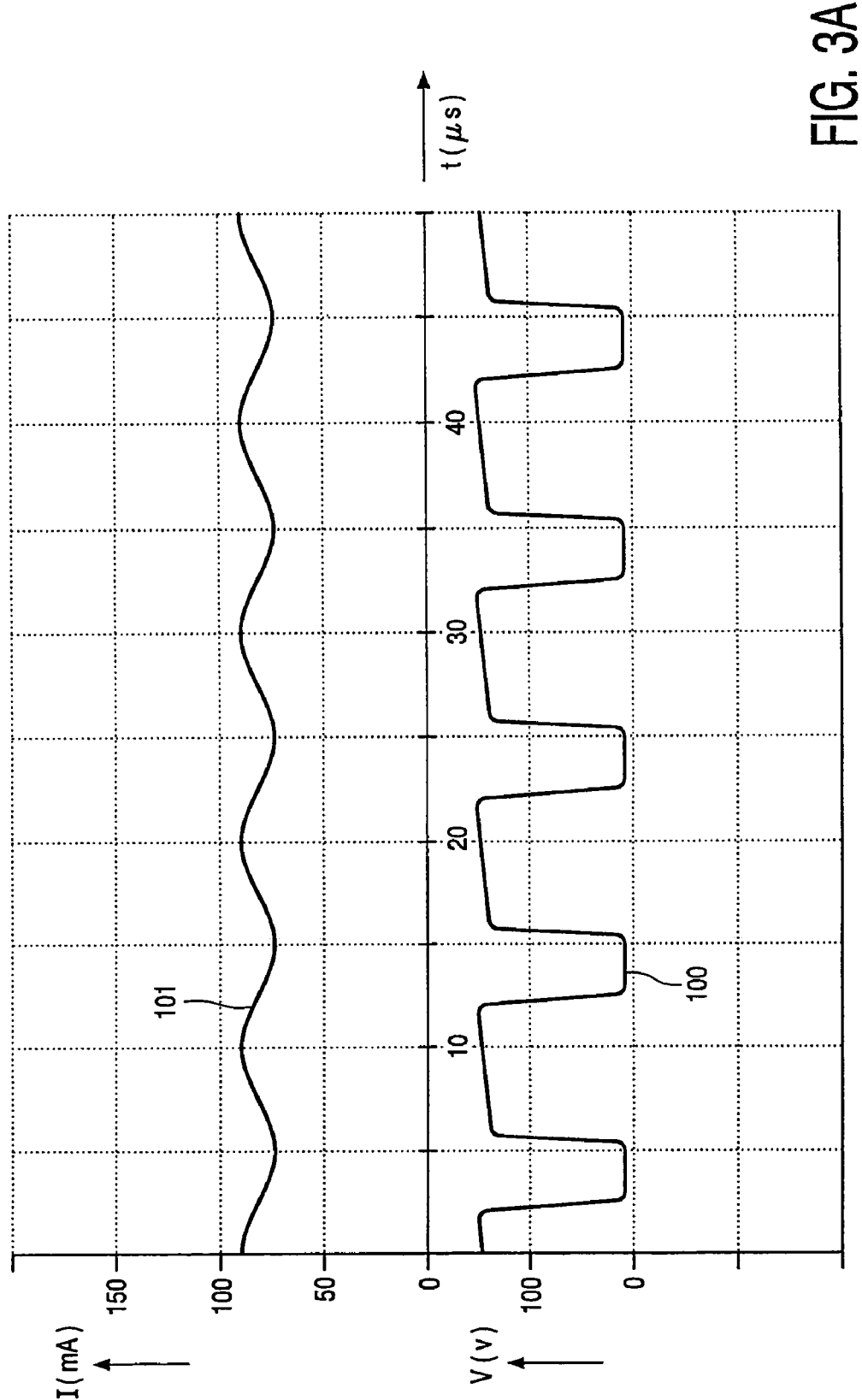
Figure 3B:
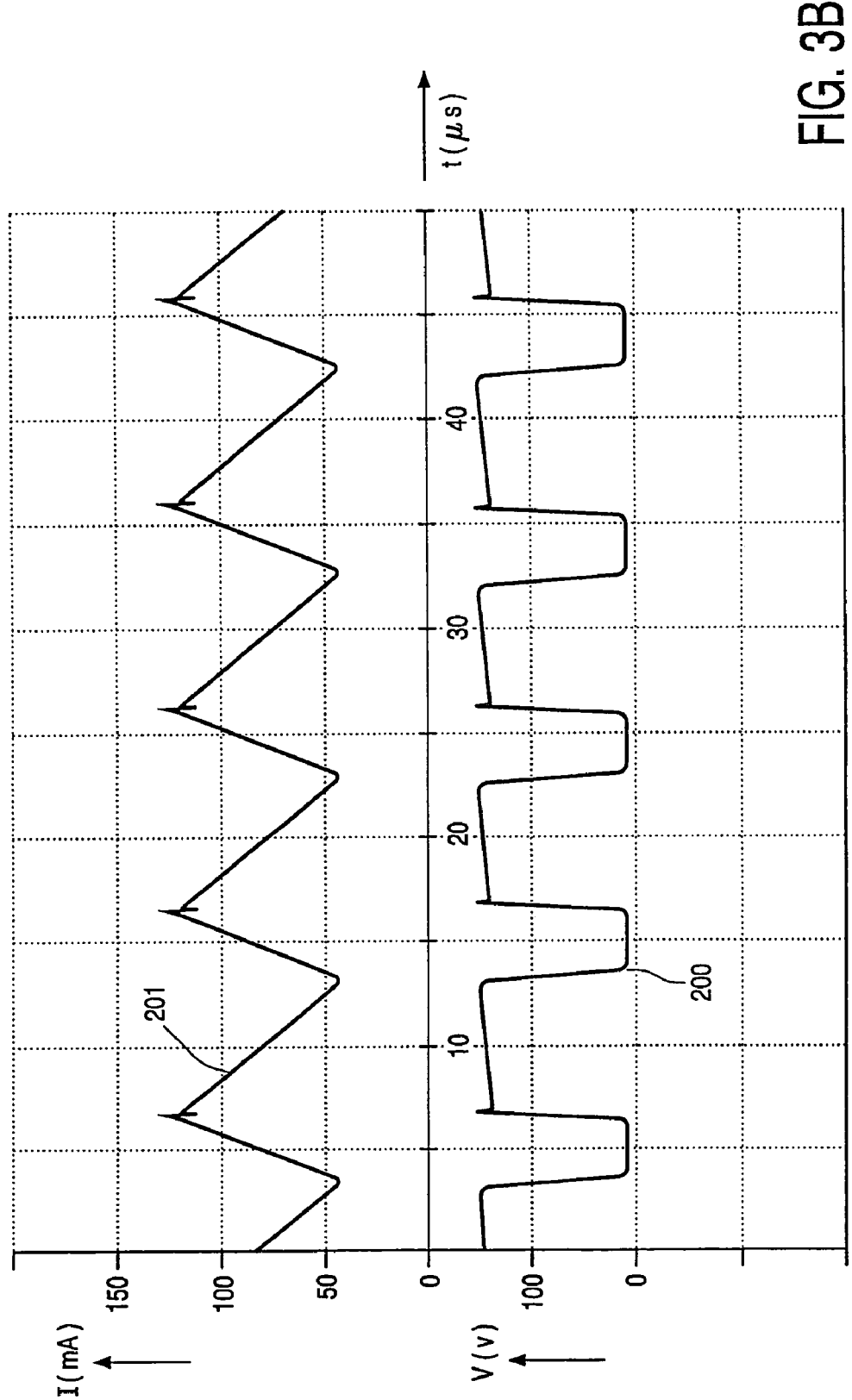

The above and further aspects of the invention will be explained in more detail hereinafter with reference to a drawing of the switching arrangement according to the invention. In the drawing FIG. 1 shows a diagram of a switching arrangement according to the invention, FIG. 2 shows a variant of the switching arrangement as shown in FIG. 1, FIG. 3A shows a current and voltage diagram of a switching arrangement according to the invention, and FIG. 3B shows a current and voltage diagram of a switching arrangement not according to the invention.

A switching arrangement according to the invention for operating at least one LED is shown in FIG. 1, which switching arrangement is provided with input terminals 1, 2 for connecting a supply source, output terminals 3, 4 for connecting the LED to be operated, a first series circuit I between one of the input terminals 1 and one of the output terminals 3, including at least a self-inductance L, a capacitor C and a diode D, a second series circuit II between the input terminals 1, 2, including at least said self-inductance L and a switching element S which is alternately switched to a conducting state and a non-conducting state at a high frequency, a third series circuit III between the output terminals 3, 4, including at least the diode D and an inductive winding SW. Furthermore, a buffer capacitor CB is arranged between the output terminals 3, 4.

The inductive winding forms a secondary winding SW of a transformer T which has a primary winding PW which forms part of both the first and the second series circuit. A connection point between the switching element S and primary winding PW forms a drain d of the switching element S.

In an advantageous embodiment, a bypass capacitor BYC is arranged between the input terminals 1, 2.

In a variant of the switching arrangement according to the invention which is shown in FIG. 2, the secondary winding is made up of a first winding SW1 and a second winding SW2, which second winding is incorporated in the first series circuit I and which also has a connection point VB with the first winding SW1. Preferably, the second winding SW2 is directly connected to one of the output terminals by means of a snubber circuit 5. The snubber circuit 5 in particular provides a reduction of voltage peaks that occur when the switching element S is switched off. This helps to achieve a further reduction of the generation of interference signals which, surprisingly, has a negligible effect on the power transfer of the inductive winding.

A practical embodiment of a switching arrangement according to the invention as described in FIG. 2, is in particular suitable for being operated on a 110V, 60 Hz supply source. The switching arrangement is suitable for operating an LED array, for example forming part of a traffic lights installation. An array which is used in practice is, for example, of the type GR 690053224, made by Lumileds Lighting, which comprises eighteen LEDs, which LEDs emit green light. The switching arrangement is capable of supplying the array with a controlled current ranging between 300 mA and 1.1 A during operation, in dependence on, inter alia, the temperature of the array.

In the switching arrangement, the self-inductance has a value L1 in the order of 3900 $\mu$H, the capacitor C has a capacitance C3 of 47 nF and the secondary winding SW of the transformer T has a self-inductance Ls of 120 $\mu$H. The winding ratio of the primary winding PW and the secondary winding SW is 1:1. The primary and the secondary winding comprise 62 and 56 turns, respectively. The first winding SW1 and the second winding SW2 of the secondary winding each have 28 turns and a self-inductance of 50 $\mu$H. The buffer capacitor CB has a value of 330 $\mu$H. The switching element S is made up of a MOSFET type IRF730, made by International Rectifier. The value of the bypass capacitor BYC is 100 nF.

When a connected array as described above is operated at a rectified sine-wave voltage of 110V, the switching element is alternately switched to a conducting and a non-conducting state during zero-axis crossing of the supply source at a high frequency varying between 50 kHz and maximally 160 kHz.

FIG. 3A shows a current and voltage diagram of the above-described practical switching arrangement, in which the horizontal axis forms the time axis. The switching arrangement is fed with 120 V dc. Curve 100 shows the trend of the voltage at the location of the drain d of the MOSFET that forms the switching element S. The current that flows at the location of the drain d is shown in graph 101.

By way of comparison, FIG. 3B shows a current and voltage diagram of a switching arrangement which comprises only one inductive winding, which is built up identically to the one that is shown in FIG. 3A. In the diagram, the curves 200 and 201 show, respectively, the trend of the voltage at the location of the drain and the trend of the current at the location of the drain.

The fraction $\delta$ of each switching period of the switching element during which the switching element is switched in a non-conducting state amounts to 7 $\mu$s. A comparison between the curves is 101 and 201 shows that the variation in the current value has been reduced from 87 mA in the case of curve 201 to 17 mA in the case of the switching arrangement according to the invention. Furthermore it is apparent that a high-frequency ripple occurring during the periodic switching of the switching element to a non-conducting state has considerably decreased in magnitude in the case of the switching arrangement according to the invention. In this manner, the occurrence of a high-frequency signal across the self-inductance is substantially entirely prevented as a result of the high-frequency switching of the switching element, as a result of which the generation of EMI has been reduced to a significant extent.

What is claimed is:

1. A switching arrangement for operating at least one LED, which switching arrangement is provided with
    input terminals for connecting a supply source,
    output terminals for connecting the LED to be operated,
    a first series circuit between one of the input terminals and one of the output terminals including at least a self-inductance, a capacitor and a diode,
    a second series circuit between the input terminals, including at least said self-inductance and a switching element which is alternatively switched to a conducting state and a non-conducting state at high frequency,
    a third series circuit between the output terminals, including at least said diode and an inductive winding,
    characterized in that the inductive winding forms a secondary winding of a transformer which has a primary winding which forms part of both the first and the second series circuits.

2. A switching arrangement as claimed in claim 1, characterized in that a bypass capacitor is arranged between the input terminals.

3. A switching arrangement for operating at least one LED, said switching arrangement comprising:
    input terminals for connecting a supply source;
    output terminals for connecting the LED;
    a first series circuit between one of the input terminals and one of the output terminals including at least a self-inductance, a capacitor and a diode;
    a second series circuit between the input terminals, including at least said self-inductance and a switching element which is alternatively switched to a conducting state and a non-conducting state; and
    a third series circuit between the output terminals, including at least said diode and an inductive winding,
    wherein said inductive winding forms a secondary winding of a transformer which has a primary winding which forms part of both the first and the second series circuits; and
    wherein the switching arrangement is configured in accordance with the relation $$2\pi[(L1+Ls)\,C3]^{1/2} > \delta,$$

wherein:
    L1 is the magnitude of the self-inductance in H,
    Ls is the magnitude of the self-inductance of the secondary winding in H,
    C3 is the capacitance of the capacitor in F, and
    $\delta$ is the fraction in s of each switching period of the switching element during which the switching element is switched in its non-conductive state.

4. A switching arrangement as claimed in claim 1, characterized in that the secondary winding is made up of a first winding and a second winding, which second winding is incorporated in said first series circuit and which also has a connection point with the first winding.

5. A switching arrangement comprising:
    a first circuit connected between a first input and a first output of said switching arrangement, said first circuit having a diode;
    a second circuit connected between said first input and a second input of said switching arrangement, said second circuit including a switching element;
    a third circuit connected between said first output and a second output of said switching arrangement, said third circuit including said diode and an inductive winding; and
    a transformer having a primary winding, wherein said inductive winding forms a secondary winding of said transformer;
    said diode having an input connected to said primary winding and said secondary winding.

6. The switching arrangement of claim 5, further comprising a bypass capacitor arranged between said first input and said second input of said switching arrangement.

7. The switching arrangement of claim 5, said first circuit further comprises a self-inductance and a capacitor.

8. The switching arrangement of claim 7, wherein said switching arrangement is configured in accordance with the relation $$2\pi[(L1+Ls)C3]^{1/2} > \delta,$$

wherein:

L1 is the magnitude of the self-inductance in H;

Ls is the magnitude of a self-inductance of the secondary winding in H;

C3 is the capacitance of the capacitor in F; and

δ is a fraction in s of each switching period of the switching element during which the switching element is switched in its non-conductive state.

9. The switching arrangement of claim 5, wherein the secondary winding includes a first winding and a second winding.

10. The switching arrangement of claim 5, wherein the secondary winding includes a first winding and a second winding, said second winding being incorporated in said first circuit and having a connection point with said first winding.

\* \* \* \* \*